(12) United States Patent
Shan et al.

(10) Patent No.: US 11,738,326 B2
(45) Date of Patent: Aug. 29, 2023

(54) SPECIAL PIG MANURE CHARCOAL MODIFIED BY AMINO GRAFTING, PREPARATION METHOD THEREOF, AND ITS APPLICATION IN THE REUSE OF NITROGEN FROM FARMLAND DRAINAGE

(71) Applicant: ZHEJIANG UNIVERSITY OF SCIENCE AND TECHNOLOGY, Hangzhou (CN)

(72) Inventors: Shengdao Shan, Hangzhou (CN); Wenbiao Zhang, Hangzhou (CN); Haifeng Zhuang, Hangzhou (CN); Genxing Pan, Hangzhou (CN); Qiaona Xie, Hangzhou (CN)

(73) Assignee: ZHEJIANG UNIVERSITY OF SCIENCE AND TECHNOLOGY, Hangzhou (CN)

( * ) Notice: Subject to any disclaimer, the term of this patent is extended or adjusted under 35 U.S.C. 154(b) by 0 days.

(21) Appl. No.: 17/919,288

(22) PCT Filed: Jul. 16, 2020

(86) PCT No.: PCT/CN2020/102509
§ 371 (c)(1),
(2) Date: Oct. 17, 2022

(87) PCT Pub. No.: WO2021/212672
PCT Pub. Date: Oct. 28, 2021

(65) Prior Publication Data
US 2023/0148315 A1   May 11, 2023

(30) Foreign Application Priority Data
Apr. 20, 2020   (CN) .......................... 202010313757.1

(51) Int. Cl.
*B01J 20/20* (2006.01)
*C05G 3/40* (2020.01)
(Continued)

(52) U.S. Cl.
CPC ......... *B01J 20/20* (2013.01); *B01J 20/28061* (2013.01); *B01J 20/3021* (2013.01);
(Continued)

(58) Field of Classification Search
None
See application file for complete search history.

(56) References Cited

U.S. PATENT DOCUMENTS

2013/0213101 A1* 8/2013 Shearer ..................... C05F 1/00
71/14

FOREIGN PATENT DOCUMENTS

CN   105272389 A   1/2016
CN   107311790 A   11/2017
(Continued)

OTHER PUBLICATIONS

Chengfang Song, et al., Changes of nutrients and potentially toxic elements during hydrothermal carbonization of pig manure, Chemosphere, 2020, pp. 1-7, vol. 243, 125331.
(Continued)

*Primary Examiner* — Wayne A Langel
(74) *Attorney, Agent, or Firm* — Bayramoglu Law Offices LLC

(57) ABSTRACT

A preparation method of charcoal-based fertilizer is provided. Particularly, a special pig manure charcoal modified by amino grafting, a preparation method thereof, and its application in the reuse of nitrogen from farmland drainage are provided. The preparation method includes the following steps: 1) drying raw pig manure to a moisture content of 80%-85% and carrying out pickling, drying, and crushing
(Continued)

successively to obtain a dried pig manure powder; 2) conducting liquid nitrogen pretreatment and high-temperature charcoalization to obtain an expanded pig manure charcoal; 3) performing carboxylation treatment to obtain a carboxylated pig manure charcoal; 4) amino grafting: adding an ammonia liquor to the carboxylated pig manure charcoal obtained in step 3), stirring for 20-24 h in an oil bath at 200-240° C.; washing and filtering; and drying and grinding to obtain the special pig manure charcoal modified by amino grafting.

10 Claims, 1 Drawing Sheet

(51) Int. Cl.
*C05G 5/40* (2020.01)
*B01J 20/28* (2006.01)
*B01J 20/30* (2006.01)
*B01J 20/32* (2006.01)
*C02F 1/28* (2023.01)
*C05C 11/00* (2006.01)
*C05C 3/00* (2006.01)
*C02F 101/10* (2006.01)
*C02F 101/16* (2006.01)
*C02F 103/20* (2006.01)

(52) U.S. Cl.
CPC ....... *B01J 20/3071* (2013.01); *B01J 20/3078* (2013.01); *B01J 20/3085* (2013.01); *B01J 20/3204* (2013.01); *B01J 20/3219* (2013.01); *B01J 20/3248* (2013.01); *C02F 1/283* (2013.01); *C05C 3/00* (2013.01); *C05C 11/00* (2013.01); *C05G 3/40* (2020.02); *C05G 5/40* (2020.02); *C02F 2101/105* (2013.01); *C02F 2101/16* (2013.01); *C02F 2103/20* (2013.01)

(56) References Cited

FOREIGN PATENT DOCUMENTS

| | | |
|---|---|---|
| CN | 108164358 A | 6/2018 |
| CN | 108467036 A | 8/2018 |
| CN | 109319777 A | 2/2019 |
| CN | 109529783 A | 3/2019 |
| CN | 109569525 A | 4/2019 |
| EP | 3587381 A1 | 1/2020 |

OTHER PUBLICATIONS

GB 3838-2002, Environmental quality standards for surface water, 2002, pp. 1-9, State Environmental Protection Administration of the State Administration of Quality Supervision, Inspection and Quarantine.

* cited by examiner

SPECIAL PIG MANURE CHARCOAL MODIFIED BY AMINO GRAFTING, PREPARATION METHOD THEREOF, AND ITS APPLICATION IN THE REUSE OF NITROGEN FROM FARMLAND DRAINAGE

CROSS REFERENCE TO THE RELATED APPLICATIONS

This application is the national phase entry of International Application No. PCT/CN2020/102509, filed on Jul. 16, 2020, which is based upon and claims priority to Chinese Patent Application No. 202010313757.1, filed on Apr. 20, 2020, the entire contents of which are incorporated herein by reference.

TECHNICAL FIELD

The present invention relates to a preparation method of a charcoal-based fertilizer, particularly to a special pig manure charcoal modified by amino grafting, a preparation method thereof, and its application in the reuse of nitrogen from farmland drainage. The present invention belongs to the field of comprehensive utilization of wastes and prevention and control of non-point source pollution of nitrogen and phosphorus in farmland.

BACKGROUND

Biochar materials have been widely used in many fields involving the environment because of their porous properties, substantially high specific surface area, and excellent performance in soil improvement and regulation and water and fertilizer management. With the rapid development of modern agricultural technology, chemical fertilizers, pesticides, etc. that are excessively applied in the planting industry, livestock and poultry manures are indiscriminately discharged in the breeding industry, which collectively leads to exceeding the nutrient load of farmland. Excess nitrogen causes groundwater pollution and water eutrophication through surface runoff and other ways. In recent years, the total nitrogen emission caused by chemical fertilizer application in China has increased to more than 6,000,000 tons, and the total phosphorus emission has increased to more than 500,000 tons. Excessive nitrogen in farmland drainage seriously destroys the water landscape, leads to an imbalance in the ecosystem, and endangers human security and development. Therefore, reducing nitrogen loss in soil, alleviating nitrogen pollution in farmland drainage, and recycling livestock and poultry manure resources are very important to control non-point source pollution in agriculture. It is urgent to develop a biochar material with directional and efficient nitrogen adsorption to act as a nitrogen fertilizer to increase crop yield and improve and restore the soil.

Biochar has a developed pore structure, abundant oxygen-containing functional groups, and stable aromatization structure. As a result, biochar can be used in soil improvement to improve soil porosity, increase soil water retention, regulate soil pH, and the like. More importantly, biochar raw materials are cheap and regenerative. In recent years, the production of livestock and poultry manures in China has increased from 2.121 billion tons in 2011 to 2.875 billion tons and is expected to reach 3.743 billion tons in 2023. The abundant livestock and poultry manure have not been timely treated and effectively utilized, which has seriously restricted the sustainable and efficient development of livestock breeding in China. According to the data of the first national census on pollution sources, livestock and poultry manures, industrial sources, and people dumping products down the drain have become the three primary sources of water pollution. Therefore, there is an urgent need to find a suitable method for resource utilization.

SUMMARY

The purpose of the present invention is to provide a preparation method of a specific pig manure charcoal modified by amino grafting. The pig manure charcoal prepared has high specific surface area and porosity and abundant and stable ammonia-containing functional groups, which significantly improves the adsorption of nitrogen from farmland drainage and alleviates nitrogen pollution in farmland drainage.

The present invention also provides a special pig manure charcoal modified by amino grafting obtained by the preparation method.

The technical solution adopted by the present invention to solve the technical problems is as follows:

A preparation method of the special pig manure charcoal modified by amino grafting includes the following steps:
1) raw material drying: performing dehydration of raw pig manure to a moisture content of 80%-85% and carrying out pickling, drying, and crushing successively to obtain a dried pig manure powder;
2) liquid nitrogen pretreatment and high-temperature charcoalization: hermetically treating the dried pig manure powder obtained in step 1) with liquid nitrogen, stirring for 30-60 min, adding anhydrous ethanol to volatilize rapidly, filtering, washing, drying, performing high-temperature calcination on the dried product for charcoalization at a temperature of 600-800° C. with the introduction of high-purity nitrogen having a purity of 98.99%-99.99%, washing the charcolized product, and drying in a vacuum at 100±5° C. for 12-24 h to obtain an expanded pig manure charcoal;
3) carboxylation treatment: ultrasonically dispersing the expanded pig manure charcoal obtained in step 2) in concentrated nitric acid with a mass concentration of 65%-68%, stirring for 4-6 h under microwaves, washing, filtering, and drying the product to obtain a carboxylated pig manure charcoal; and
4) amino grafting: adding an ammonia liquor to the carboxylated pig manure charcoal obtained in step 3), stirring for 20-24 h in an oil bath at 200-240° C., washing and filtering the reaction product after cooling to room temperature, drying the product in a vacuum at 110±5° C. for 12-24 h after blow-drying with nitrogen, and grinding to obtain the special pig manure charcoal modified by amino grafting.

Pig manure charcoal itself has excellent properties, and doping nitrogen in pig manure charcoal can improve the wettability, biocompatibility, and electrical conductivity of the material. The grafting of an amino group ensures the grafting rate of the amino group, makes the material have higher reaction activity, and further improves the adsorption of nitrogen from water, which in turn enables the material to be recycled as nitrogen fertilizer and applied to farmland again, achieving resource utilization of wastes by "using waste to treat waste" and reducing cost.

There are three main forms of nitrogen in fertilizer: ammonium nitrogen, nitrate nitrogen, and urea nitrogen (or amide nitrogen). Among them, ammonium nitrogen and nitrate nitrogen can be easily absorbed by plants. Ammonium nitrogen is in a reduced state as a cation, and nitrate nitrogen is in an oxidized state as an anion. Based on amino grafting, the pig manure charcoal can adsorb a large amount of ammonium nitrogen. Nitrogen doping can improve the adsorption of anions, that is, the material can absorb most of the nitrogen through chemical reaction and electrostatic interaction to achieve the reuse of nitrogen fertilizer.

The present invention uses waste pig manure as raw material to prepare the pig manure charcoal modified by amino grafting technology through liquid nitrogen pretreatment, high-temperature charcoalization, and amino grafting, which can be configured to reduce the nitrogen pollution in farmland drainage and achieve the reuse in farmland.

Preferably, in step 1), the pickling, drying, and crushing are performed as follows: immersing into 1-2 mol/L $H_3PO_4$ or $HNO_3$, slowly stirring for 3-5 h with a stirrer at a speed of 100-200 r/min, quickly stirring for 1-2 h with the stirrer at a speed of 500-600 r/min, drying for 12-24 h in an oven at 85-110° C., and crushing to a particle size less than 0.1 mm.

Preferably, in step 2), the weight ratio of the dried pig manure powder to the liquid nitrogen is 2:(1-1.5), and the stirring speed is 200-400 rpm. The anhydrous ethanol is added 2-3 times with a time interval of two additions being 1.5-2.5 min, and the weight ratio of each addition of anhydrous ethanol to the dried pig manure powder is 2:(0.8-1.5). Subsequently, water washing and filtration are performed.

Preferably, in step 2), the high-temperature calcination for charcoalization is carried out in a high-temperature tube furnace, the high-purity nitrogen is introduced at a flow rate of 400-650 mL/min, and the washing is conducted with anhydrous ethanol and water alternately until the pH of the solution is neutral.

Preferably, in step 3), the expanded pig manure charcoal is ultrasonically dispersed in concentrated nitric acid at an ultrasonic frequency of 40 kHz for an ultrasonic time of 0.5-2 h. A microwave heating furnace is used for stirring under heating at a power of 200-300 W and a speed of 300-600 r/min. The washing is performed with anhydrous ethanol and water alternately until the pH of the solution is neutral, followed by drying in the vacuum at 85-100° C.

Preferably, in step 4), the ammonia liquor is a supercritical ammonia liquor with a concentration of 2-3 mol/L that is obtained at a temperature of 320° C. and a pressure of 10 MPa. The weight ratio of the carboxylated pig manure charcoal to the supercritical ammonia liquor is 2:(2-3), and the nitrogen is introduced at a flow rate of 300-600 mL/min. The washing is performed with anhydrous ethanol and water alternately until the pH of the solution is neutral.

Preferably, in step 2), the nitrogen doping content is 5-10%, and in step 4), the amino group content in amino grafting is 10-15 wt %.

In step 2), the liquid nitrogen treatment is carried out to achieve nitrogen doping. In step 3, the carboxylation treatment is carried out with concentrated nitric acid to enhance the reaction activity of the surface of the carbon material. In step 4), the use of supercritical ammonia liquor is for amino grafting. In the method of the present invention, the purpose of nitrogen doping is to improve the electron density on the surface of the carbon material, reduce the adsorption energy between the carbon material and nitrogen, and improve the adsorption efficiency. The amino group is a functional group for adsorbing nitrogen in the process of amino grafting.

The special pig manure charcoal modified by amino grafting is prepared by the method described in the present invention. In the special pig manure charcoal modified by amino grafting, the amino group content is 10-15 wt %, the nitrogen doping content is 5-10%, and the specific surface area is 110-130 $m^2/g$.

An application of the special pig manure charcoal modified by amino grafting is the reduction of nitrogen pollution in farmland drainage and the reuse of nitrogen.

Preferably, farmland drainage is introduced into a high-efficiency adsorption reactor with pig manure charcoal. The high-efficiency adsorption reactor is formed by three reaction pools connected successively. The first reaction pool is configured for rapid adsorption, and a turbine stirrer is provided at the bottom with a speed of 300-600 r/min. The special pig manure charcoal modified by amino grafting is added to the first reaction pool, and the volume ratio of the material added to the reactor is 1:(15-20). The effluent of each reaction pool passes through a porous isolating net at the bottom. The second reaction pool is configured for interception and adsorption. A turbine agitator is also provided at the bottom of the second reaction pool for stirring while intercepting the pig manure charcoal. After fully absorbing the nitrogen in water until exceeding adsorption equilibrium, the special pig manure charcoal modified by amino grafting enters the third reaction pool, i.e., an inclined plate sedimentation pool. After the reaction, the precipitate is collected and air-dried or heat-dried to obtain a slow-release charcoal-based nitrogen fertilizer.

The special pig manure charcoal adsorbing nitrogen to saturation is recycled to obtain a slow-release charcoal-based nitrogen fertilizer, which is applied to improve soil fertility. The amount of the slow-release carbon-based nitrogen fertilizer applied is 3-5 wt %.

During the application of the slow-release charcoal-based nitrogen fertilizer, the nitrogen content is measured and the optimum application amount is determined according to the physical and chemical properties of the local soil. The fertilizer is applied to the soil in the ditches between the rows of crops and covered with soil.

Compared with the prior art, the present invention has the following advantages:

1) The special pig manure charcoal modified by amino grafting of the present invention has high specific surface area and porosity and abundant and stable ammonia-containing functional groups.

2) The special pig manure charcoal modified by amino grafting of the present invention is configured to reduce the nitrogen pollution in farmland drainage and has high efficiency and stable performance, is economic and eco-friendly, results in high energy recovery, and exhibits easy application, thus being suitable for engineering applications of farmland drainage treatment or improving existing projects.

3) The raw material of the present invention is derived from waste pig manures, and the preparation method using the raw material belongs to the preparation technology capable of achieving resource utilization of wastes by "using waste to treat waste" and sustainable development, which effectively solves the problem of high added value utilization of pig manures and has good economic and environmental benefits.

4) The special pig manure charcoal with supersaturated adsorption acts as slow-release charcoal-based nitrogen fertilizer to be reused in farmland, which can improve soil structure and fertility.

BRIEF DESCRIPTION OF THE DRAWINGS

FIG. 1A is an ordinary pig manure charcoal. FIG. 1B is a special pig manure charcoal.

DETAILED DESCRIPTION OF THE EMBODIMENTS

Figure 1A:
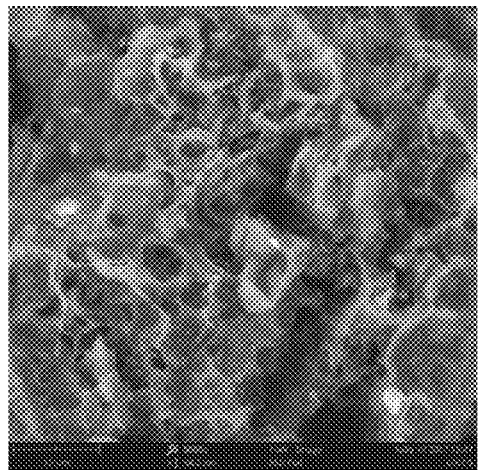
FIGS. 1A and 1B show electron microscope images of the special pig manure charcoal.

The technical solution of the present invention is further described in detail below with reference to specific embodiments. It should be understood that the implementation of the present invention is not limited to the following embodiments, and any formal modifications and/or changes made to the present invention shall fall within the scope of protection of the present invention.

In the present invention, all parts and percentages are present in a unit of weight unless otherwise specified, and the equipment and raw materials used can be purchased from the market or commonly used in the art. The methods in the following embodiments are conventional methods in the art unless otherwise specified.

Embodiment 1

A preparation method of special pig manure charcoal modified by amino grafting is specifically as follows:

1) Raw Material Drying:

Raw pig manure is dehydrated to a moisture content of 800%-85%, pickled with 1 mol/L $HNO_3$, slowly stirred with a stirrer at a speed of 100-200 r/min for 3 h, quickly stirred with the stirrer at a speed of 500-600 r/min for 1 h, dried at 100° C. for 12 h in an oven, and crushed until the particle size is less than 0.1 mm to obtain a dried pig manure powder.

2) Liquid Nitrogen Pretreatment and High-Temperature Charcoalization:

The dried pig manure powder is hermetically treated with liquid nitrogen, and the weight ratio of the dried pig manure powder to the liquid nitrogen is 2:1. The treated powder is magnetically stirred at a speed of 300 rpm for 40 min, and anhydrous ethanol is added 2 times within 4 min. The weight ratio of each addition of anhydrous ethanol to the dried pig manure powder is 2:1. Subsequently, water washing and filtration are performed, followed by drying at 100° C. for 12 h in the oven. The dried product is charcolized in a high-temperature tube furnace at a charcoalization temperature of 700° C. with the introduction of 99.99% high-purity nitrogen at a flow rate of 500 mL/min. The charcolized product is washed with water and dried in a vacuum at 100° C. for 15 h to obtain an expanded pig manure charcoal.

3) Carboxylation Treatment:

The expanded pig manure charcoal is ultrasonically dispersed in concentrated nitric acid at an ultrasonic frequency of 40 kHz for an ultrasonic time of 1 h. Then the resulting mixture is stirred under heating by a microwave heating furnace at a power of 300 W and a speed of 400 r/min for 5 h, washed alternately with anhydrous ethanol and water until the pH of the solution is neutral, and then dried in a vacuum at 85° C. to obtain a carboxylated pig manure charcoal.

4) Amino Grafting:

The carboxylated pig manure charcoal is added with a supercritical ammonia liquor with a concentration of 2 mol/L that is prepared at a temperature of 320° C. and a pressure of 10 MPa. The weight ratio of the carboxylated pig manure charcoal to the supercritical ammonia liquor is 2:3. Then the resulting mixture is heated in an oil bath until the temperature is 220° C. and magnetically stirred for 20 h. The reaction product is washed and filtered after being cooled to room temperature. After being blow-dried with nitrogen at a flow rate of 400 mL/min, the product is dried in a vacuum at 110° C. for 15 h and ground to obtain the special pig manure charcoal modified by amino grafting

Contrast Example 1

An ordinary pig manure charcoal is prepared by a high-temperature calcination method including the specific process that is the same as that in Embodiment 1, except that step 3) carboxylation treatment and step 4) amino grafting and nitrogen doping are not carried out. The process yields ordinary pig manure charcoal.

Figure 1B:
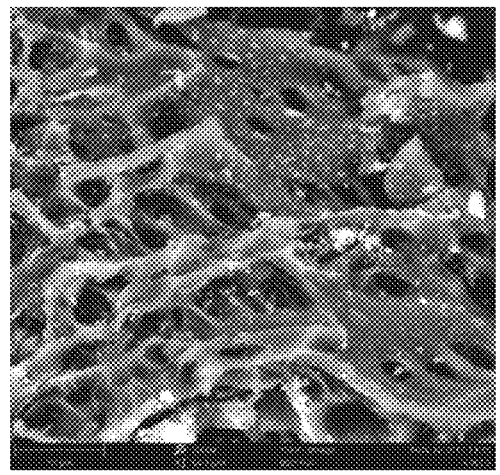

The special pig manure charcoal is detected and analyzed by X-ray photoelectron spectroscopy to determine the chemical bonding information on the surface of the special pig manure charcoal. Results show that the special pig manure charcoal prepared by Embodiment 1 has the amino group content of 11.5 wt % and the nitrogen doping content of 6.7%. The pig manure charcoal prepared by contrast example 1 has the amino group content of 2.1 wt % and the nitrogen doping content of 1.3%. As shown in the electron microscope images of FIGS. 1A-1B, compared with the pig manure charcoal, the special pig manure charcoal has more pores and a specific surface area as high as 115.3 $m^2/g$, which is significantly higher than that (7.2 $m^2/g$) of ordinary pig manure charcoal, thus possessing better adsorption and physical structure.

Embodiment 2

A method of strengthening the reduction of nitrogen pollution in farmland drainage by using the special pig manure charcoal modified by amino grafting prepared in Embodiment 1 is as follows:

A high-efficiency adsorption reactor is formed by three reaction pools successively connected. The volume ratio of the first reaction pool, the second reaction pool, and the third reaction pool is 3:1:2. The special pig manure charcoal modified by amino grafting is added to the first reaction pool. In the method, farmland drainage is treated in the high-efficiency adsorption reactor with the pig manure charcoal, and water continuously flows into the reactor with a hydraulic retention time of 48 h.

The first reaction pool is configured for rapid adsorption, and a turbine stirrer is provided at the bottom with a speed of 500 r/min. The special pig manure charcoal modified by amino grafting is added to the reaction pool, and the volume ratio of the material added to the reactor is 1:15. The effluent of each reaction pool passes through a porous isolating net at the bottom.

The second reaction pool is configured for interception and adsorption. A turbine agitator is also provided at the bottom of the second reaction pool for stirring while intercepting the pig manure charcoal. After fully absorbing the nitrogen in water until exceeding adsorption equilibrium, the special pig manure charcoal modified by amino grafting enters the third reaction pool.

The third reaction pool is an inclined plate sedimentation pool to carry out solid-liquid separation of the special pig manure charcoal. The precipitate is collected and air-dried or heat-dried to obtain a slow-release charcoal-based nitrogen fertilizer.

When the slow-release charcoal-based nitrogen fertilizer is applied, the nitrogen content is measured and an optimum application amount is determined according to the physical and chemical properties of the local soil. The fertilizer is applied to the ditches between the rows of crop and covered with soil.

Application Embodiment 1

Farmland drainage: The crops used in the experiment on farmland drainage are single cropping rice. The experimental period is 20 days after fertilization. The nitrogen pollution of farmland drainage includes an ammonia nitrogen concentration of 14.2±2.5 mg/L, a total nitrogen concentration of 18.5±1.7 mg/L, excessive nitrogen nutrients, water quality deterioration, and potential risk of water eutrophication.

The ordinary pig manure charcoal (contrast example 1) and the special pig manure charcoal (Embodiment 1) are respectively used for carrying out the experiment of farmland drainage treatment based on the method described in Embodiment 2. The maximum nitrogen adsorption capacity of the two pig manure charcoals is detected and analyzed after the high-efficiency adsorption reactor operates stably. The results are shown in Table 1.

TABLE 1

Nitrogen adsorption and removal performance of the special pig manure charcoal modified by amino grafting

| Material | Ammonia nitrogen adsorption capacity (mg/g) | Total nitrogen adsorption capacity (mg/g) | Ammonia nitrogen removal rate (%) | Total nitrogen removal rate (%) |
|---|---|---|---|---|
| Ordinary pig manure charcoal (Contrast example 1) | 1.4 | 0.9 | 47 | 32 |
| Special pig manure charcoal (Embodiment 1) | 7.2 | 4.1 | 91 | 82 |

Table 1 shows that the special pig manure charcoal modified by amino grafting has efficient adsorption of ammonia nitrogen and total nitrogen for farmland drainage. The maximum adsorption capacity is 5.1 times and 4.6 times higher than that of the ordinary pig manure charcoal, respectively. The removal rates of ammonia nitrogen and total nitrogen are stable at about 90% and 80%. After treatment, nitrogen of the effluent is efficiently reused by using the special pig manure charcoal, the water quality is significantly improved, and there is no potential risk of water eutrophication. The farmland drainage after treatment meets the standard limit of the basic items of environmental quality standards for surface water (GB3838-2002), class V. The pig manure charcoal modified by amino grafting significantly enhances the adsorption of nitrogen from farmland drainage.

Application Embodiment 2.

Soil Improvement by Slow-Release Charcoal-Based Nitrogen Fertilizer

The experiment is carried out on farmland near a pig farm, and the pig barnyard manure is taken from the pig farm. The special pig manure charcoal adsorbing nitrogen to saturation is recycled and applied to the soil, and the weight percentage of the pig manure charcoal applied in the soil is 3%. The effect of the special pig manure charcoal modified by amino grafting on soil improvement and yield increase is shown in Table 2.

TABLE 2

Effect of the special pig manure charcoal modified by amino grafting on soil improvement and yield increase

| Parameter | Bulk density of soil (g/cm$^3$) | Dissolution of nitrogen fertilizer (%) | *Capsicum annuum* (g) | *Solanum lycopersicum* (g) |
|---|---|---|---|---|
| Untreated soil | 0.83 | 45.1 | 78 | 107 |
| Add charcoal-based fertilizer | 0.55 | 31.1 | 113 | 153 |

Table 2 shows that compared with untreated soil, the application of the special pig manure charcoal can effectively reduce the bulk density of the soil and improve the soil water and fertilizer holding capacity. Pig manure charcoal itself has good nutrient elements, increased fertility after absorbing nitrogen to saturation, slow-release effect, and the dissolution rate of nitrogen fertilizer being reduced by 31.1%, which is suitable for the practical application of soil improvement. The application of the special pig manure charcoal increases the yields of *Capsicum annuum* and *Solanum lycopersicum* by 40%-50%. Therefore, the special pig manure charcoal has good practical application value in soil improvement and yield increase.

To sum up, after the pig manure is charcolized at high temperature, the contents of ash, organic charcoal, total phosphorus, total potassium, and available potassium are higher than those of pig barnyard manure, while the contents of total nitrogen, available phosphorus, and alkali-hydrolyzable nitrogen decrease. The special pig manure charcoal is modified to absorb the nitrogen from farmland drainage to act as the slow-release charcoal-based nitrogen fertilizer, which makes up for the nitrogen deficiency in ordinary pig manure charcoal and plays a significant role in soil fertilization, reduction of chemical fertilizer, and plant yield increase. At the same time, it saves the treatment cost of pig manure charcoal regeneration and avoids secondary pollution, which is a method of turning waste into treasure and recycling.

Each embodiment in this specification is described progressively. The described highlighted in each embodiment is different in that part from other embodiments. One of ordinary skill in the art can refer to the same or similar parts of each embodiment. Because the device disclosed by the embodiment corresponds to the method disclosed by the embodiment, the description of the device is relatively simple, and the relevant details can be found in the description of the method section.

The above is a detailed description of the special pig manure charcoal modified by amino grafting, the preparation method, and its application in reuse of nitrogen from farmland drainage provided by the present invention. The principle and implementation of the present invention are described combined with specific embodiments, and the description of the above embodiments is only configured to help explain the method and the core idea of the present invention. It should be pointed out that for those of ordinary skill in the art, a variety of improvements and modifications to the present invention can also be carried out without departing from the principle of the present invention, and these improvements and modifications also fall within the scope of protection claimed by the present invention.

What is claimed is:

1. A preparation method of a special pig manure charcoal modified by amino grafting, comprising the following steps:

1) raw material drying: performing a dehydration of raw pig manure to a moisture content of 80%-85%, pickling, drying, and crushing successively to obtain a dried pig manure powder;

2) liquid nitrogen pretreatment and high-temperature charcoalization: hermetically treating the dried pig manure powder obtained in step 1) with liquid nitrogen, stirring for 30-60 min, adding anhydrous ethanol to volatilize rapidly, filtering, washing, drying, performing a high-temperature calcination on a dried product for a charcoalization at a temperature of 600-800° C. with an introduction of high purity nitrogen having a purity of 98.99%-99.99%, washing a charcolized product and drying in a vacuum at 100±5° C. for 12-24 h to obtain an expanded pig manure charcoal;

3) carboxylation treatment: ultrasonically dispersing the expanded pig manure charcoal obtained in step 2) in concentrated nitric acid with a mass concentration of 65%-68%, stirring for 4-6 h under microwaves, washing, filtering, and drying a first resulting product to obtain a carboxylated pig manure charcoal; and 4) amino grafting: adding an ammonia liquor to the carboxylated pig manure charcoal obtained in step 3), stirring for 20-24 h in an oil bath at 200-240° C., washing and filtering a second resulting product after cooling to room temperature, drying the second resulting product in a vacuum at 110±5° C. for 12-24 h after blow-drying with nitrogen, and grinding to obtain the special pig manure charcoal modified by amino grafting.

2. The preparation method according to claim 1, wherein in step 1), the pickling, drying, and crushing are performed as follows: immersing into 1-2 mol/L $H_3PO_4$ or $HNO_3$, slowly stirring for 3-5 h with a stirrer at a speed of 100-200 r/min, quickly stirring for 1-2 h with the stirrer at a speed of 500-600 r/min, drying for 12-24 h in an oven at 85-110° C., and crushing to a particle size less than 0.1 mm.

3. The preparation method according to claim 1, wherein in step 2), a weight ratio of the dried pig manure powder to the liquid nitrogen is 2:(1-1.5), and a stirring speed is 200-400 rpm; and the anhydrous ethanol is added 2-3 times with a time interval of two additions being 1.5-2.5 min, a weight ratio of each addition of the anhydrous ethanol to the dried pig manure powder is 2:(0.8-1.5), and subsequent washing with water and filtration are conducted.

4. The preparation method according to claim 1, wherein in step 2), the high-temperature calcination for the charcoalization is carried out in a high-temperature tube furnace, the high-purity nitrogen is introduced at a flow rate of 400-650 mL/min, and the washing is conducted with anhydrous ethanol and water alternately until a pH of a solution is neutral.

5. The preparation method according to claim 1, wherein in step 3), the expanded pig manure charcoal is ultrasonically dispersed in the concentrated nitric acid at an ultrasonic frequency of 40 kHz for an ultrasonic time of 0.5-2 h.

6. The preparation method according to claim 1, wherein in step 4), the ammonia liquor is a supercritical ammonia liquor with a concentration of 2-3 mol/L obtained at a temperature of 320° C. and a pressure of 10 MPa;

a weight ratio of the carboxylated pig manure charcoal to the supercritical ammonia liquor is 2:(2-3), and the nitrogen is introduced at a flow rate of 300-600 mL/min.

7. The preparation method according to claim 1, wherein in step 2), a nitrogen doping content is 5-10%, and in step 4), an amino group content in the amino grafting is 10-15 wt %.

8. A special pig manure charcoal modified by amino grafting prepared by the method according to claim 1, wherein in the special pig manure charcoal modified by amino grafting, an amino group content is 10-15 wt %, a nitrogen doping content is 5-10%, and a specific surface area is 110-130 $m^2/g$.

9. A method for reduction of nitrogen pollution in farmland drainage and a reuse of nitrogen comprising the step of applying the special pig manure charcoal modified by amino grafting prepared by the method according to claim 1 to the farmland drainage system.

10. The method according to claim 9, wherein the step of applying the special pig manure charcoal modified by amino grafting further comprises:

introducing the farmland drainage into a high-efficiency adsorption reactor with the special pig manure charcoal, wherein the high-efficiency adsorption reactor is formed by three reaction pools connected successively, a first reaction pool is configured for a rapid adsorption, and a turbine stirrer is provided at a bottom with a speed of 300-600 r/min, the special pig manure charcoal modified by amino grafting is added to the first reaction pool, and a volume ratio of a material added to the high-efficiency adsorption reactor is 1:(15-20), an effluent of each reaction pool passes through a porous isolating net at the bottom, a second reaction pool is configured for interception and adsorption, a turbine agitator is also provided at a bottom of the second reaction pool for stirring while intercepting the special pig manure charcoal, the special pig manure charcoal modified by amino grafting enters a third reaction pool after fully absorbing the nitrogen in water until exceeding an adsorption equilibrium, the third reaction pool being an inclined plate sedimentation pool, a precipitate is collected and air-dried or heat-dried to obtain a slow-release charcoal-based nitrogen fertilizer after a reaction.

\* \* \* \* \*